United States Patent Office 3,433,765
Patented Mar. 18, 1969

3,433,765
METHOD FOR THE PRODUCTION OF SILICONE GUMS
Lothar Ernst Geipel, Adrian, Mich., assignor to Stauffer Chemical Company, New York, N.Y., a corporation of Delaware
No Drawing. Filed Aug. 7, 1967, Ser. No. 658,618
U.S. Cl. 260—46.5                                 9 Claims
Int. Cl. C08g 47/06, 31/09

ABSTRACT OF THE DISCLOSURE

Polymerization reactions yielding silicone gums are speeded through the use of a particular catalyst aided by a promoter. The catalyst is derived by the reaction of a tetra-alkyl ammonium hydroxide and a siloxane tetramer while the promoter is characterized by its ability to increase the concentration of free anions through cation solvation.

---

This invention relates to a method for the production of silicone gums.

While applicable to gums derived from organopolysiloxanes in which all of the organo groups are methyl groups, the invention is considered especially valuable as applied in the production of phenyl-containing gums. Such gums are of particular interest because of their flexibility at low temperatures. They also have other desirable properties such as high strength, self-adhesion and sponge-forming capability which adapt them for special applications.

The phenyl-containing silicone gums are conventionally produced by copolymerizing a cyclic siloxane comprising phenyl groups and a cyclic siloxane incorporating only methyl groups. Normally, the cyclic siloxane in each case incorporates 4 silicon atoms and a like number of oxygen atoms. In the instance of the phenyl cyclic, the organo portion of the siloxane may be made up entirely of phenyl groups or it may include methyl groups. Using a phenyl cyclic incorporating methyl as well as phenyl groups, the monomeric mixture usually contains about 7.5 mole percent, or 13 percent by weight, of the phenyl-methyl cyclic. On the other hand, if the phenyl-containing siloxane is free of organo groups other than phenyl, the same is usually employed in a somewhat greater amount, 17.8 percent by weight being considered near optimum.

The tetramers above mentioned are embraced by the type formula

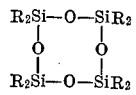

For simplicity, the designation $D_4$ is used herein where all of the R's are methyl, $D'_4$ where the R's are mixed methyl and phenyl and $D''_4$ where all of the R's are phenyl. Such compounds are properly generically designated as octa-organocyclotetrasiloxanes.

It is to be here repeated that the present invention, although considered of greatest significance as applied in the manufacture of phenyl gums, also has application to the homopolymerization of the methyl tetramer, $D_4$. In any case, siloxanes other than the tetramer or tetramers may be present in the material processed according to the invention. In fact, a normal constituent thereof is a siloxane fraction the components of which predominate in linear siloxanes which are "end-blocked" with trimethyl silyl groups $Si(CH_3)_3$. Such fraction desirably averages out to a siloxane of the empirical formula $Si_9O_8(CH_3)_{20}$. The purpose of the trimethyl silyl-containing siloxanes is to control the degree of polymerization, i.e. the chain length of the product copolymer. In addition thereto, there may be present in the reaction mixture cyclic siloxanes containing 3 or 5 or more silicon atoms and siloxanes comprising vinyl groups which aid in the ultimate curing of the gum.

Although the art here involved has shown progressive improvement both process and product-wise during the years, it is generally recognized that it would be advantageous if the polymerization reaction could be achieved more speedily and this represents a principal object of the present invention.

Heretofore the polymerization reaction has been effected using both acidic and basic catalysts, the latter being generally preferred. Typical basic catalysts include alkali metal hydroxides, alkali metal salts of various siloxanes, alkali metal silicates, tri-sodium phosphate, tri-potassium phosphate and quaternary ammonium hydroxides.

The process of the invention is characterized by the use of a particular catalyst in conjunction with a material, hereinafter referred to as the "promoter," having the ability by virtue of its polar nature to increase the concentration of free anions in the reaction mixture through cation solvation. As exemplary of such materials may be mentioned: dimethyl sulfoxide, hexamethylphosphoric triamide and N,N-dialkyl carboxylic amides such as dimethylformamide and dimethylacetamide.

As the catalyst there is employed according to the invention the reaction product of a tetra-alkyl ammonium hydroxide and an octa-organocyclotetrasiloxane.

The octa-organocyclotetrasiloxanes which are applicable to the invention include the $D_4$ siloxanes previously mentioned. In fact, the octa-organocyclotetrasiloxane preferred for use in accordance with the invention is octa-methylcyclotetrasiloxane. As exemplary of other octa-organocyclotetrasiloxanes which can be employed may be mentioned the corresponding ethyl, methyl and butyl compounds. Because of stability factors, octa-organo-cyclotetrasiloxanes containing more than 4 aliphatic carbon atoms in the organo group are not recommended.

The quaternary ammonium siloxanate which is apparently formed as the product of the reaction between the tetra-alkyl ammonium hydroxide and the octa-organocyclotetrasiloxane is a "fugitive" catalyst, i.e. it disappears incident to the polymerization reaction. The physical character of the siloxanate depends on the nature of the organo groups present in the reactants employed to obtain the same. In general, however, the siloxanates are produced as viscous liquids.

Any suitable procedure may be followed in the production of the quaternary ammonium siloxanate. Two methods which have been found satisfactory are indicated as below:

(a) A 40 ml. portion of $D_4$ and 2 g. of 60 percent tetramethyl ammonium hydroxide are introduced into a glass tube equipped with a magnetic stirrer. The contents of the tube are heated to 70° C. under stirring. This results in melting of the tetramethyl ammonium hydroxide which forms a lower layer. To remove water, the tube is connected to a high vacuum system at intervals of 1½ minutes. The hydroxide and siloxane react completely in about 15 minutes to give a viscous solution. Heating is continued for another 20 minutes with vacuum removal of the water as before. The siloxanate so prepared has a concentration of about 20 mgs. of tetramethyl ammonium hydroxide per ml. of siloxanate solution.

(b) 10 g. of 60 percent tetramethyl ammonium hydroxide and 120 ml. of $D_4$ are placed in a large test tube provided with a stirrer, an addition tube and nitrogen inlet tube. With the stirred mixture maintained at a temperature of the order of 90° C., a slow stream of nitrogen is passed therethrough, the inlet tube being kept about 2″ below the liquid surface. The reaction is allowed to proceed for about 120 minutes, additional $D_4$ being added to replace that lost by volatilization. There is obtained in a yield of about 90 percent 114 g. of a viscous solution of tetraethyl ammonium siloxanate.

Using the catalyst-promoter combinations embraced by the invention, it has been found that if the polymerization reaction is carried out in the presence of an inert solvent as toluene, for example, relatively low temperatures may be employed. Thus, the reaction mixture is normally maintained at temperatures within the range 60°–100° C.

The catalyst herein as aided by the cation-capturing promoter is effective in low concentrations, i.e. in amounts corresponding to 10–100 p.p.m. of the tetra-alkyl ammonium hydroxide used in the preparation of the catalyst.

The promoter is normally added in an amount equivalent to from 1 to 2.5 percent of the weight of the siloxane mixture.

The invention is further illustrated by the following examples which are not to be taken as in any way limitative of the scope thereof.

Example 1

A 1-liter resin kettle is fitted with a stirrer, thermometer, and nitrogen inlet and outlet connections. The kettle is purged with dry nitrogen before charging of the reactants and a nitrogen flow is maintained throughout the charging and the polymerization reaction.

To the kettle is added 350 ml. (332 g.) of $D_4$, 56.5 g. of $D''_4$, sufficient vinylcyclosiloxanes to account for 0.16 percent by weight of the total siloxanes charged, 0.2 ml. of "$MD_7M$" end-blocker (mixed trimethylsilyl end-blocked dimethylsiloxanes of an average composition corresponding to eicosamethylnonasiloxane) and 200 ml. of toluene. The mixture is heated to boiling (125°–126° C. pot temperature) then cooled to 82° C. whereafter there is introduced the siloxanate catalyst prepared according to the procedure of (a) supra, the amount of catalyst added corresponding to 50 p.p.m. of tetramethyl ammonium hydroxide. The solid which precipitates soon after addition of the catalyst slowly disappears as the mixture is maintained at 82° C. Polymerization to gum stage requires from 6 to 6½ hours.

Final processing consists in heating the mixture over a period of 1 to 1½ hours at 155°–165° C. to drive off most of the toluene and then applying a vacuum for about 1 hour, an ultimate vacuum of 0.5 mm. being attained.

Example 2

The procedure of Example 1 is repeated but with the addition of 7.5 ml. (7.1 g.—corresponding to 1.8 percent of the weight of the reaction mixture) of dimethyl formamide. This reduces the time to gum stage to 1 hour. The dimethyl formamide is added to the reactants prior to the application of heat.

Example 3

The procedure followed is that of Example 1 except for the addition of 8.7 g. of dimethyl acetamide. The gum stage is reached in ½ hour. Here again, the promoter is added to the kettle before the application of heat.

Example 4

Following the general procedure of Example 1, dimethyl sulfoxide is used as the promoter. The gum stage is attained in 9 minutes.

Example 5

To the resin kettle is charged 500 ml. $D_4$, 0.31 ml. $MD_7M$, 0.53 ml. of catalyst (a) and 10 ml. dimethyl formamide, the latter being added with the siloxanes as part of the initial charge, the catalyst being added after heating of the mixture to 83° C. A stiff gum results in only 1 minute after addition of the catalyst.

Example 6

The experiment of Example 5 is repeated using a mixture of $D_4$ and $D'_4$, the latter accounting for about 17–18 percent of the weight of the siloxane mixture. Hexamethylphosphoric triamide is employed as the promoter. Upon heating of the mixture and addition of catalyst (b) similar results are attained, gum formation being markedly speeded.

The invention claimed is:
1. Method of obtaining gums by polymerizing a siloxane fraction containing cyclic siloxanes meeting the formula:

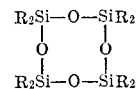

where R is methyl or phenyl, said method comprising including in the reaction mixture (a) a catalyst constituted of the pre-formed product of the reaction of a tetra-alkyl ammonium hydroxide and an octa-organocyclotetrasiloxane in which none of the organo groups contains in excess of 8 carbon atoms and (b) a promoter for the catalyst having the ability by virtue of its polar nature to increase the concentration of free anions in the reaction mixture through cation solvation.

2. Method of claim 1 as applied to the copolymerization of octa-methylcyclotetrasiloxane and octa-phenylcyclotetrasiloxane.

3. Method of claim 1 as applied to the copolymerization of octa-methylcyclotetrasiloxane and octa-methylphenylcyclotetrasiloxane.

4. Method of claim 1 as applied to the homopolymerization of octa-methylcyclotetrasiloxane.

5. Method according to claim 1 where the polymerization reaction is carried out in the presence of an inert solvent at a temperature of the order of 60°–100° C. using as the promoter a compound selected from the group consisting of dimethyl sulfoxide, hexamethylphosphoric triamide and N,N-dialkyl carboxylic amides.

6. Process according to claim 5 when the promoter is employed in an amount equivalent to from 1 to 2.5 percent of the weight of the siloxane(s) and the catalyst is employed in an amount corresponding to from about 10 to about 100 p.p.m. of the tetra-alkyl ammonium hydroxide used in the preparation thereof.

7. Method of claim 6 as applied to the copolymerization of octa-methylcyclotetrasiloxane and octa-phenylcyclotetrasiloxane.

8. Method of claim 6 as applied to the copolymerization of octa-methylcyclotetrasiloxane and methylphenylcyclotetrasiloxane.

9. Method of claim 6 as applied to the homopolymerization of octa-methylcyclotetrasiloxane.

References Cited

UNITED STATES PATENTS

| | | | |
|---|---|---|---|
| 3,337,497 | 8/1967 | Bostick | 260—46.5 |
| 3,328,346 | 6/1967 | Spork | 260—46.5 |
| 3,305,524 | 2/1967 | Brown et al. | 260—46.5 |
| 2,994,684 | 8/1961 | Johannson | 260—46.5 |
| 2,634,284 | 4/1953 | Hyde | 260—448.2 |

FOREIGN PATENTS 578,667  6/1959  Canada.

DONALD E. CZAJA, *Primary Examiner.*

M. J. MARQUIS, *Assistant Examiner.*